(12) United States Patent
Reinwald et al.

(10) Patent No.: US 9,403,221 B2
(45) Date of Patent: Aug. 2, 2016

(54) ONE HANDED PLUNGE BASE FOR A ROUTER

(71) Applicants: Robert Bosch Tool Corporation, Broadview, IL (US); Robert Bosch GmbH, Stuttgart (DE)

(72) Inventors: Ruben Reinwald, Schwaigern (DE); David Pozgay, Wilmette, IL (US)

(73) Assignee: Robert Bosch GmbH, Stuttgart (DE)

( * ) Notice: Subject to any disclaimer, the term of this patent is extended or adjusted under 35 U.S.C. 154(b) by 90 days.

(21) Appl. No.: 14/210,554

(22) Filed: Mar. 14, 2014

(65) Prior Publication Data

US 2014/0271015 A1 Sep. 18, 2014

Related U.S. Application Data

(60) Provisional application No. 61/781,428, filed on Mar. 14, 2013.

(51) Int. Cl.
*B23C 1/20* (2006.01)
*B27C 5/10* (2006.01)

(52) U.S. Cl.
CPC ... *B23C 1/20* (2013.01); *B27C 5/10* (2013.01); *B23C 2220/56* (2013.01); *B23C 2255/12* (2013.01); *Y10T 409/30784* (2015.01); *Y10T 409/306552* (2015.01); *Y10T 409/306608* (2015.01)

(58) Field of Classification Search
CPC ........... Y10T 409/306608; Y10T 409/306582; B23C 1/20; B27C 5/10
USPC .......................................... 144/136.95, 154.5
See application file for complete search history.

(56) References Cited

U.S. PATENT DOCUMENTS

| | | | | | |
|---|---|---|---|---|---|
| 1,565,790 | A | * | 12/1925 | Carter | B27C 5/10 144/135.4 |
| 1,581,719 | A | * | 4/1926 | Carter | B23Q 11/005 15/143.1 |
| 3,466,973 | A | * | 9/1969 | Rees | 409/182 |
| 4,640,324 | A | * | 2/1987 | Lounds | B23Q 9/0064 144/137 |
| 4,770,573 | A | * | 9/1988 | Monobe | 409/182 |
| 4,938,264 | A | * | 7/1990 | Ferenczffy | 144/154.5 |
| 5,207,253 | A | * | 5/1993 | Hoshino et al. | 144/136.95 |
| 5,671,789 | A | * | 9/1997 | Stolzer et al. | 144/154.5 |
| 6,419,429 | B1 | * | 7/2002 | Long et al. | 409/182 |
| 6,474,378 | B1 | * | 11/2002 | Ryan et al. | 409/182 |
| 6,655,470 | B1 | * | 12/2003 | Chen | 173/47 |
| 6,913,429 | B1 | * | 7/2005 | Phillips et al. | 409/182 |
| 7,367,760 | B2 | * | 5/2008 | Onose et al. | 409/182 |

(Continued)

*Primary Examiner* — Daniel Howell
*Assistant Examiner* — Yasir Diab
(74) *Attorney, Agent, or Firm* — Maginot Moore & Beck LLP

(57) ABSTRACT

A plunge base for a power tool includes a base plate having a generally flat bottom surface and defining an opening through which a router bit of a router supported by the plunge base extends to engage a workpiece. A carriage support extends vertically upward from the base plate on one side of the opening. A router carriage is slidably retained on the carriage support. The router carriage is slidable toward and away from the base plate between a first position and a second position and is configured to releasably secure a router thereto the router aligned with the opening in the base. A plunge lock mechanism is configured to retain the router carriage at any position between and including the first position and the second position in relation to the carriage support.

12 Claims, 8 Drawing Sheets

(56) References Cited

U.S. PATENT DOCUMENTS 7,921,888 B2 * 4/2011 Sommerville et al. ..... 144/253.1
2003/0007843 A1 * 1/2003 Cotton et al. ................. 409/182
2005/0079025 A1 * 4/2005 Oberheim .................... 409/182

* cited by examiner

ONE HANDED PLUNGE BASE FOR A ROUTER

CROSS-REFERENCE TO RELATED APPLICATIONS

This application claims priority to U.S. Provisional Application Ser. No. 61/781,428 entitled "ONE HANDED PLUNGE BASE FOR A ROUTER" by Reinwald et al., filed Mar. 14, 2013, the disclosure of which is hereby incorporated herein by reference in its entirety.

TECHNICAL FIELD

The present invention relates to routers and more particularly to plunge base units for routers.

BACKGROUND

Plunge base routers have long been used to make grooves and cuts of various types. Such routers include a housing having a motor which rotates a router bit for making grooves and cuts in a work. The housing is vertically movable relative a base on two guide posts that are connected to the base. It is known that a plunge base router can be used in an upright (or normal position) and an inverted position for use under a router table. In the upright position, the router can plunge on the posts and is used to make cutouts, for grooving and edge-forming of wood or other solid-surface materials. When the router is mounted under the table, it is used like a shaper mainly for cutting repetitive shapes and for heavy decorative edge-cuts. When used in the upright position, the term cutting depth is used to describe the amount that the bit is exposed through the base. When used in the inverted position, the term cutting height describes the amount that the bit is exposed above the router table.

Typically, the housing of the plunge base router is slidable on the guide posts to permit plunging of the router and positioning of the housing relative to the base. The housing contains a compression spring adjacent to at least one of the guide posts for biasing the housing away from the base. The compression spring may be on the outside or inside of the post. Most plunge base routers provide a depth adjustment mechanism to accurately position the bit at the correct cutting depth or height. Some routers provide a coarse adjustment mechanism to generally find the depth or height and a fine adjustment mechanism to accurately locate the depth or height. The coarse and fine adjustment mechanisms are both used to arrange the router for the desired cutting depth or height.

DRAWINGS

DESCRIPTION

Figure 1:
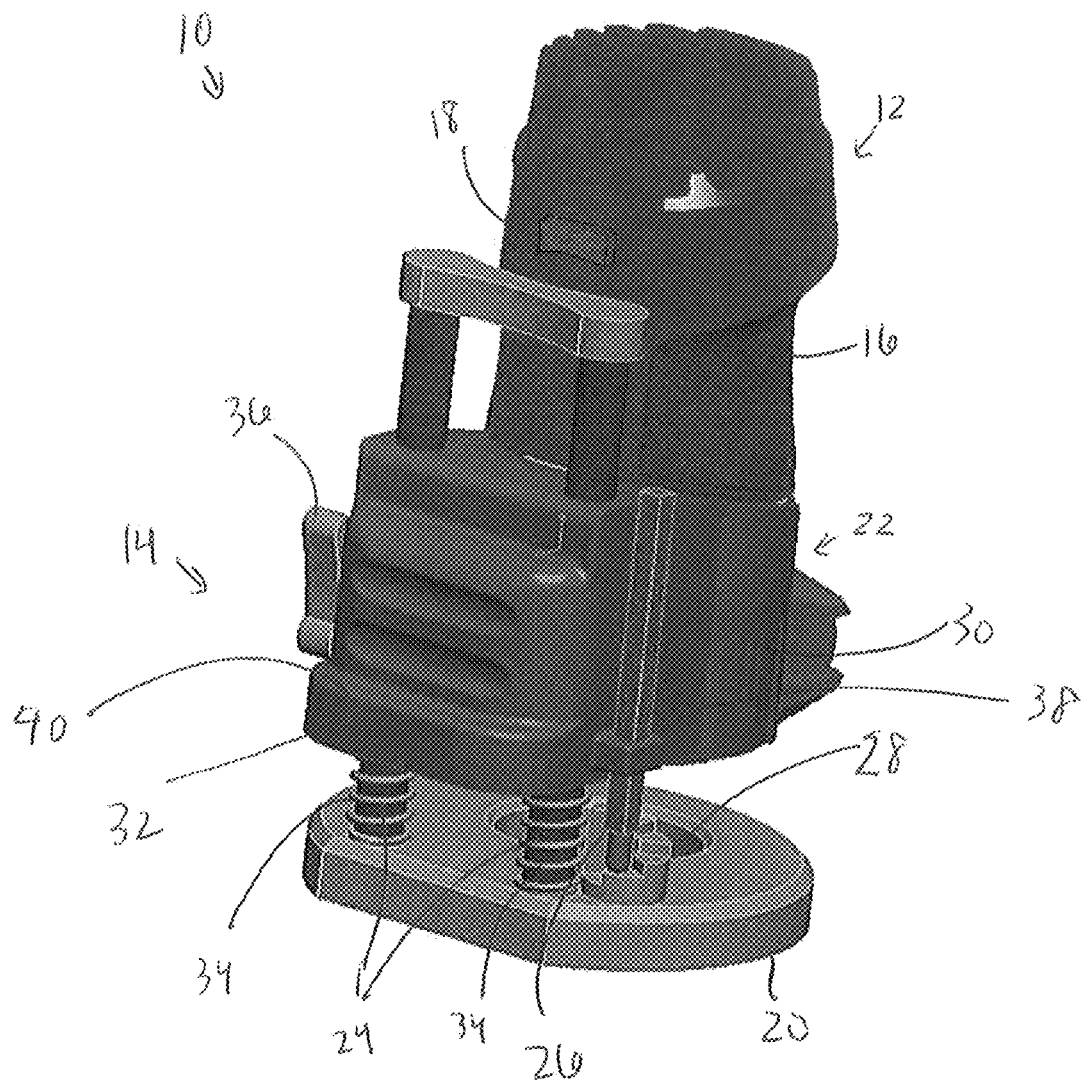
FIG. 1 depicts a perspective view of one embodiment of a plunge router assembly in accordance with the present disclosure.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to one of ordinary skill in the art to which this disclosure pertains.

According the disclosure, a plunge base for a power tool includes a base plate having a generally flat bottom surface and defining an opening through which a router bit of a router supported by the plunge base extends to engage a workpiece. A carriage support extends vertically upward from the base plate on one side of the opening. A router carriage is slidably retained on the carriage support. The router carriage is slidable toward and away from the base plate between a first position and a second position and is configured to releasably secure a router thereto the router aligned with the opening in the base. A plunge lock mechanism is configured to retain the router carriage at any position between and including the first position and the second position in relation to the carriage support.

A depth stop mechanism may be incorporated into the plunge base which defines a depth limit and is configured to prevent movement of the router carriage toward the base plate past the depth limit. The carriage support may include at least one guide post that extends upwardly from the base plate on one side of the opening. In some embodiments, two guide posts are used with both guide posts extending upwardly from the base plate on one side of the opening in the base plate.

The router carriage includes a slide portion that is slidably retained on the guide posts and a router retaining portion that extends from the slide portion over the opening in the base plate for releasably securing the router thereto. The at least one guide post may include a biasing spring located between the slide portion of the router carriage and the base plate for biasing the router carriage toward the first position. The slide portion of the router carriage includes a gripping portion that protrudes from the slide portion on a side opposite from the router retaining portion.

In one embodiment, the plunge lock mechanism may comprise a fastening mechanism and a lever. The fastening mechanism is incorporated into the slide portion and configured to be moved into and out of engagement with the at least one guidepost by the lever. The lever is located exterior to the slide portion and adjacent to the gripping portion for access by an operator of the plunge base. In another embodiment, the plunge lock mechanism includes an electromagnet and a switch. The electromagnet is incorporated into the slide portion adjacent the at least one guide post, and the switch being located on the exterior of the slide portion and configured to control power to the electromagnet. The electromagnet is configured to magnetically attach to the at least one guide post in response to being power on by the switch.

The plunge base may include a carriage positioning system configured to controllably move the router carriage between the first position and the second position in relation to the at least one guide post with an actuator which allows the system to be operated. In one embodiment, the carriage positioning system comprises a rack and pinion system including a linear gear located on the at least one guide post and a pinion gear rotatably supported by the router carriage in position to engage the linear gear. The actuator comprises a dial attached to the pinion gear which allows the pinion gear to be manually rotated by an operator. Rotation of the pinion gear in relation to the linear gear causes the router carriage to move up or down the at least one guide post depending on a direction of rotation of the dial.

In one embodiment, the pinion gear is attached to a shaft and the dial is coupled to the shaft by a planetary gear system such that the dial rotates the shaft via the planetary gear system. The dial may include a micro wheel that is rotatable with respect to the dial and secured to the shaft for directly rotating the shaft and the pinion gear without rotating the dial and the planetary gear system. This allows finer-grained position adjustments than the dial. In another embodiment, the dial may include a push button coupling mechanism which couples the dial to the shaft in a first position so the dial can rotate the pinion gear directly without the planetary gear system and that couples the dial to the planetary gear system in a second position so that the dial rotates the shaft via the planetary gear system.

Figure 2:
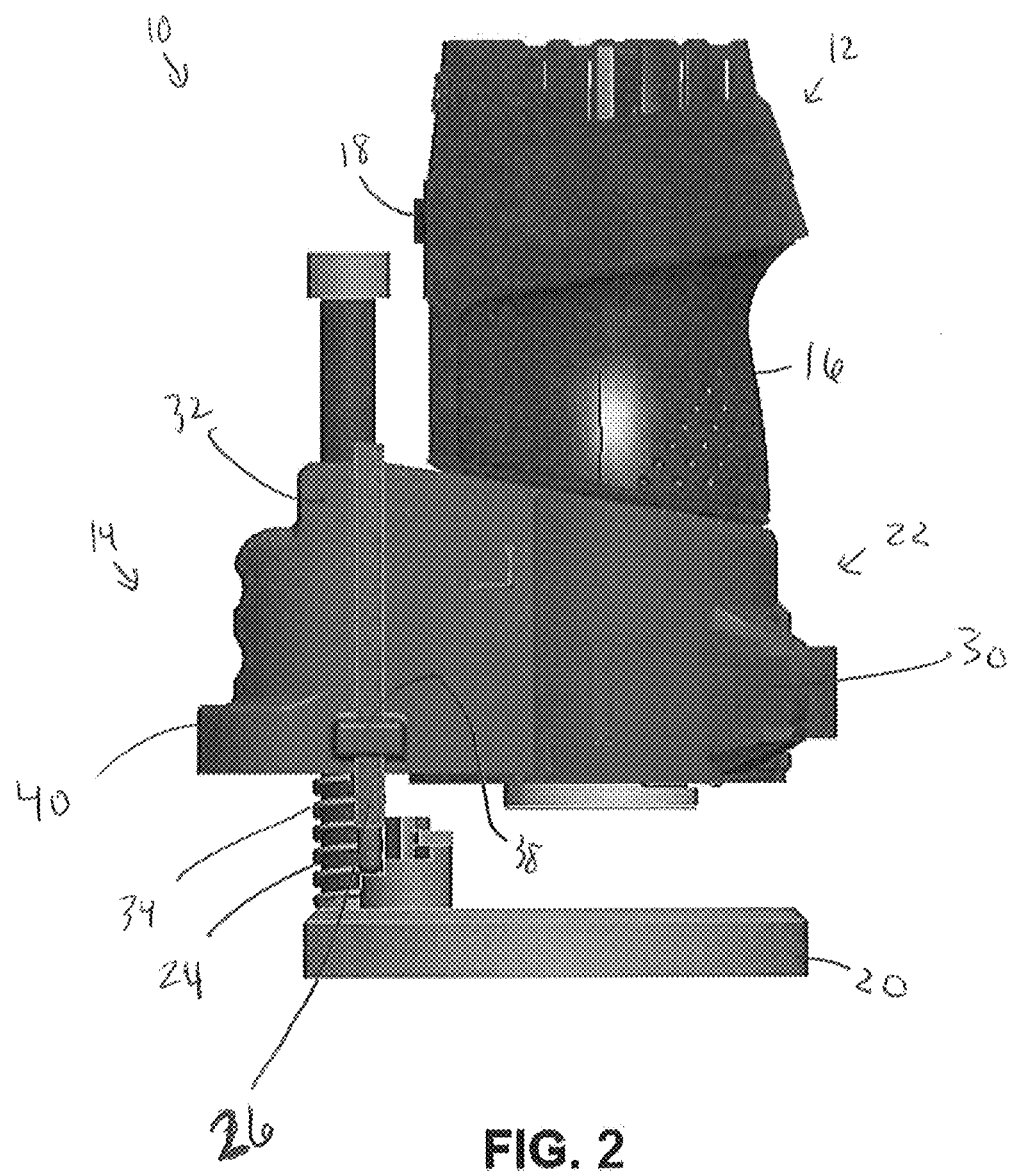
FIG. 2 depicts a side elevational view of the plunge router assembly of FIG. 1.

Referring now to the drawings, FIGS. 1 and 2 depict one embodiment of a one-handed plunge router assembly 10 according to the disclosure. The plunger router assembly 10 includes a router 12 and a plunge base 14. The router 12 includes a generally cylindrically shaped housing 16 constructed of a rigid material such as plastic, metal, or composite materials such as a fiber reinforced polymer. The housing 16 includes a nose portion and a main body portion. The main body portion encloses a motor (not shown). In one embodiment, the motor comprises an electric motor configured to receive power from a rechargeable battery (not shown) connected at the base of the housing 16. Alternatively, electric power for the motor may be received from an electrical cord (not shown) via an AC outlet.

Power to the motor is controlled by a power switch 18 provided on the housing 16. The motor includes a drive shaft (not shown) that is configured to be rotated by the motor about a motor axis. The drive shaft supports an accessory tool holder (not shown), such as a chuck, clamp, or collet, exterior to the nose portion of the housing 16. The tool holder is configured to releasably secure various router bits to the drive shaft for rotation by the motor.

The plunge base 14 of the router assembly 10 includes a base plate 20, a carriage 22, a carriage support 24, and a depth stop mechanism 26. The base plate 20 comprises a plate member having a generally flat, bottom surface configured to support the router 12 and carriage 22 above a workpiece (not shown). The base plate defines an opening 28 through which a router bit may be extended to engage a workpiece. A work contact surface is provided on the bottom of the base plate 20. The work contact surface is configured to slide smoothly upon a workpiece. The base plate 20 is configured to have a small footprint to allow the router to be used in areas with limited space.

The carriage 22 includes a collar portion 30 and a mounting portion 32. The collar portion 30 of the carriage is configured to releasably retain the router 12 and to hold the router 12 so that it is oriented perpendicularly with respect to the base plate 20 and aligned with the opening 28 defined in the base plate. The collar portion 30 of the carriage may have a variety of different configurations for releasably retaining the router. In the embodiment of FIG. 1, the collar portion of the router defines an open-ended passage through which the body of the router 12 extends. In one embodiment, the collar portion 30 includes some type of fastening system, such as a clamping mechanism (not shown), for securing the router to the carriage 22. As an alternative to having a router that is removably secured to the carriage, the router 12 may be substantially permanently affixed to the carriage 22.

The mounting portion 32 of the carriage 22 is movably attached to the carriage support 24. The mounting portion 32 and the carriage support 24 are configured to cooperate to enable the carriage 22 to move axially toward and away from the base plate 20. The mounting portion 32 of the carriage 22 is configured to move axially between a first position, or home position, that is distally located with respect to the base plate 20 and a second position, or lowermost position, that is adjacent to the base plate 20. When the router 12 is secured to the carriage 22 with the carriage in the first position, a router bit mounted on the router is spaced apart from the base plate. When the carriage 22 is moved toward the second position, the router bit (not shown) can be extended through the opening in the base plate to perform work on a workpiece.

The carriage support 24 comprises one or more posts, referred to herein as guide posts, that extend upwardly from the support portion of the base plate. In the embodiment of FIGS. 1 and 2, the carriage support comprises a pair of guide posts 24. The mounting portion 32 of the carriage 22 defines two passages (not shown) that are sized and positioned to slidably receive the pair of guide posts. The guide posts may be received in bushings (not shown) within the mounting portion 32 that facilitate the movement of the carriage 22 with respect to the guide posts 24. The mounting portion 32 of the carriage 22 includes biasing mechanisms, such as coil springs 34, that are configured to bias the carriage 22 toward the first position and away from the base plate 20.

The mounting portion 32 of the carriage 22 may include a plunge lock mechanism 36 for releasably locking the carriage 22 to the guide posts 24 at substantially any position between the first position and the second position. In the embodiment of FIGS. 1 and 2, the plunge lock 36 comprises a lever that operates a fastening mechanism (not shown), such as a screw or clamp, located within the mounting portion. The lever 36 is movable between a locked and an unlocked position. When in the locked position, the fastening mechanism is positioned in engagement with one of the guide posts thereby preventing movement of the carriage with respect to the guide posts. When in the unlocked position, the fastening mechanism is disengaged from the guide posts so as to allow movement of the carriage with respect to the guide posts.

The plunge base 14 includes a depth stop mechanism 26 that enables the lower limit of the path of movement, i.e., plunge depth, of the carriage 22 to be set to a position above the lowermost position of the carriage 22. In the embodiment of FIGS. 1 and 2, the depth stop mechanism 26 comprises a rod that is translatably received within a passage 38 defined on the carriage 22. The rod 26 extends from the passage 38 toward the base plate so that, as the carriage 22 is plunged toward the base plate 20, the end portion of the rod 26 engages the base plate 20 to prevent further downward movement of the carriage 22. The rod 26 can be translated within the passage to move the end portion of the rod closer to or farther away from the base plate in order to adjust the plunge depth to a desired level.

The configuration of the plunge base 14 enables the plunge router assembly 10 to be operated with one hand. For example, the plunge router assembly 10 can be operated by grabbing the router 12 or the carriage 22 and pressing downwardly. The power switch for the router is provided on the body of the router near this location as is the lever for the plunge lock mechanism. As can be seen in FIG. 1, the carriage may be provided with a gripping portion 40 that protrudes from the mounting portion 32 of the carriage 22 that can be gripped by the user's other hand if desired for two-handed operation. The hands of the user are thus close to the axis of the router 12 which gives better control over the router during operation.

The plunge base 14 does not require handles that traditionally extend outwardly from the base for operating the router. As a result, the plunge router assembly has a narrower configuration than traditional plunge routers that are equipped with handles. The narrower configuration allows increased visibility of the work area and facilitates the use of the plunge router in cramped areas and tight spaces, such as up against walls and in corners, where space is limited. In addition, the plunge router can be operated with a single hand which makes it even easier to operate in tight spaces and cramped locations that might otherwise preclude two-handed access to the router assembly.

Figure 3:
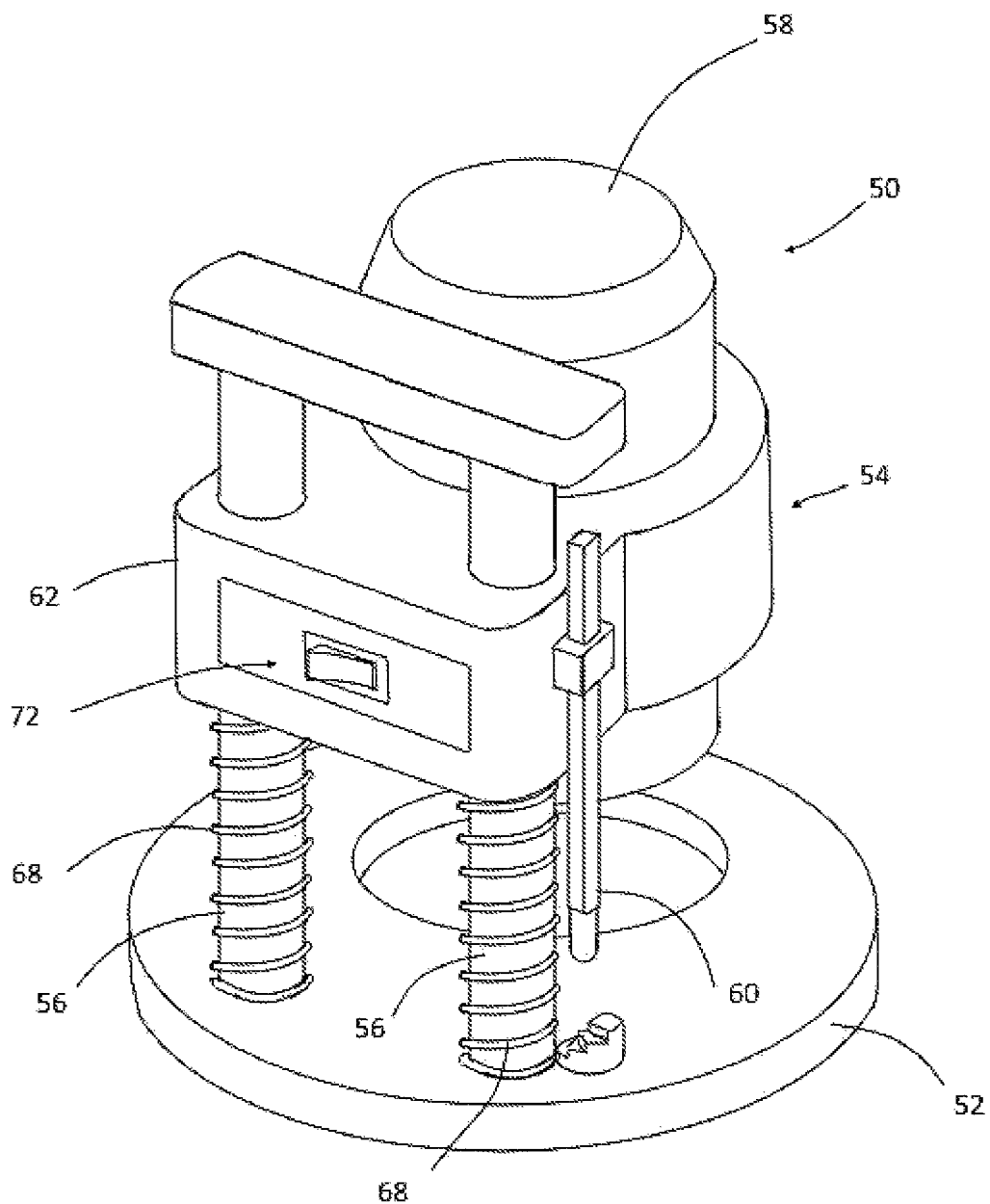
FIG. 3 depicts an alternative embodiment of the plunge router assembly of FIG. 1 including a magnetic plunge lock.
Figure 4:
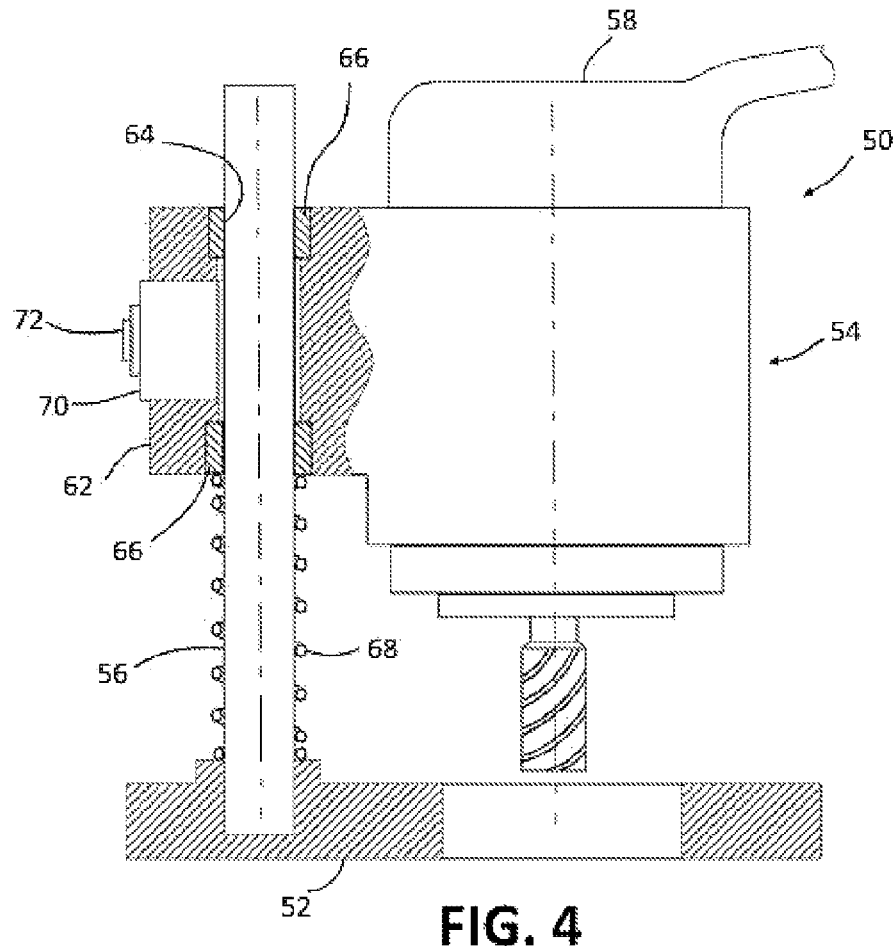
FIG. 4 depicts a side cross-sectional view of the plunge router assembly of FIG. 3.
Figure 5:
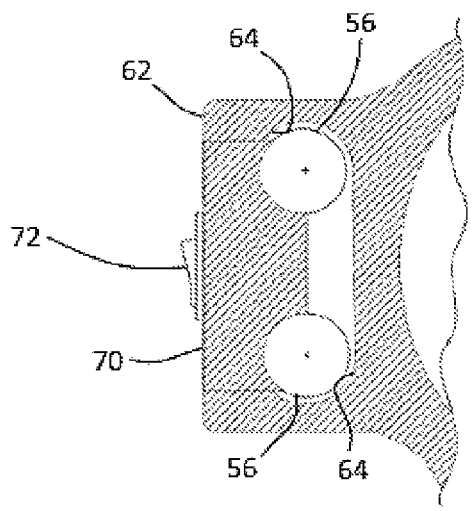
FIG. 5 depicts a cross-sectional view of the mounting portion of the carriage of the plunge router assembly of FIGS. 3 and 4.

In the embodiment of the plunge router assembly 10 of FIGS. 1 and 2, one-handed operation of the router assembly is enabled by two guide posts with spring biasing for returning the carriage to the home position and a spring loaded plunge lock for locking the carriage in position relative to the base plate. FIGS. 3-5 depict an embodiment of a plunge router assembly 50 that includes a magnetic plunge lock for locking the carriage in position with respect to the base.

The plunge router assembly 50 of FIGS. 3-5 includes a base plate 52, carriage 54, guide posts 56, router 58, and depth stop mechanism 60 that are similar to the corresponding components of the plunge router assembly 10 of FIGS. 1 and 2. The mounting portion 62 of the carriage 54 defines passages 64 that receive the pair of guide posts 56. Bushings 66 are positioned in the mounting portion 62 to facilitate movement of the carriage 54 along the guide posts 56. Coil springs 68 are provided on the guide posts 56 below the carriage 54 for biasing the carriage 54 into the home position away from the base plate 52. The coil springs 68 may be provided on the inside or the outside of the posts.

As can be seen in FIG. 4, an electromagnet 70 is provided in the mounting portion 62 of the carriage 54 for locking the carriage in position on the guide posts. The electromagnet 70 is configured to receive power from the router 58 when the router is mounted to the carriage. For example, the router and the collar portion of the carriage may be provided with complementary electrical contacts that make an electrical connection when the router is secured to the carriage. A power switch 72 is provided on the mounting portion of the carriage for controlling power to the electromagnet 70 in order to turn the magnet lock on and off. As an alternative to the use of the electromagnet, a conventional magnet could be used for locking the carriage in position relative to the base plate.

Figure 6:
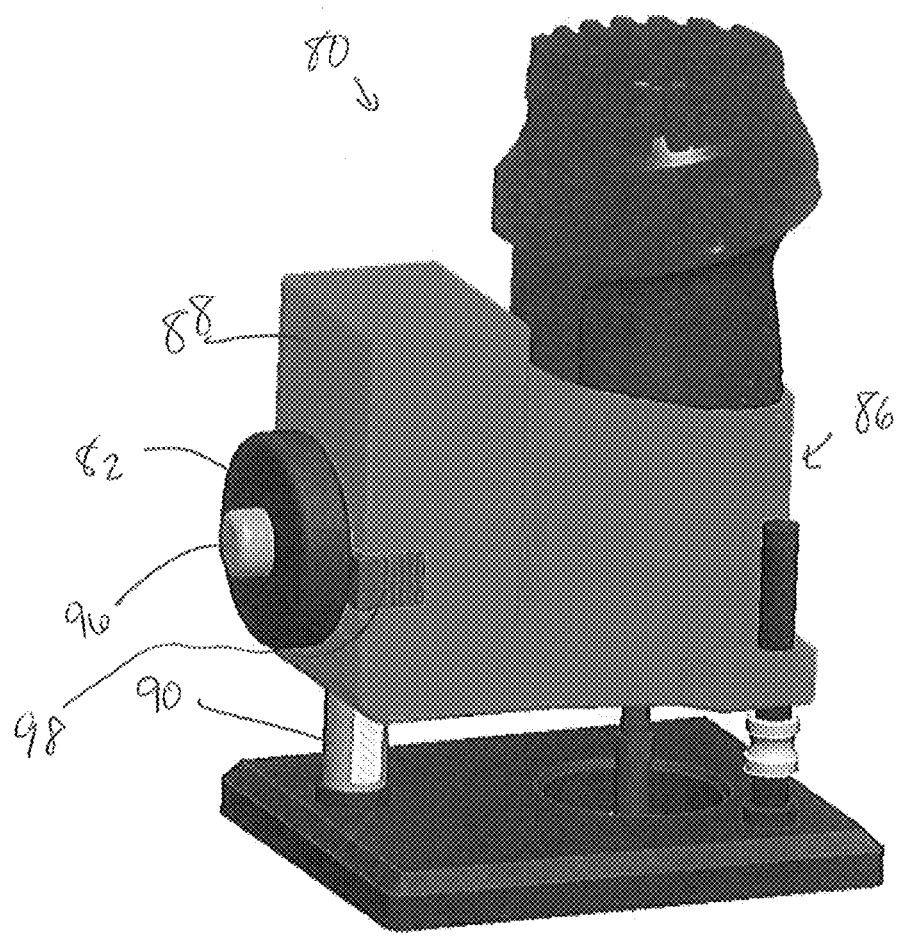
FIG. 6 depicts another alternative embodiment of the plunge router assembly of FIG. 1 including a rack and pinion plunge system.
Figure 7:
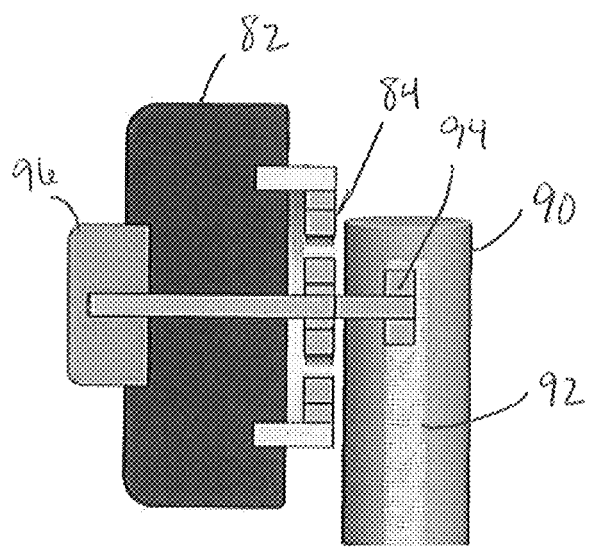
FIG. 7 depicts a partial fragmentary view of the rack and pinion movement system of the assembly of FIG. 6 showing the dial, pinion gear, and linear gear.
Figure 8:
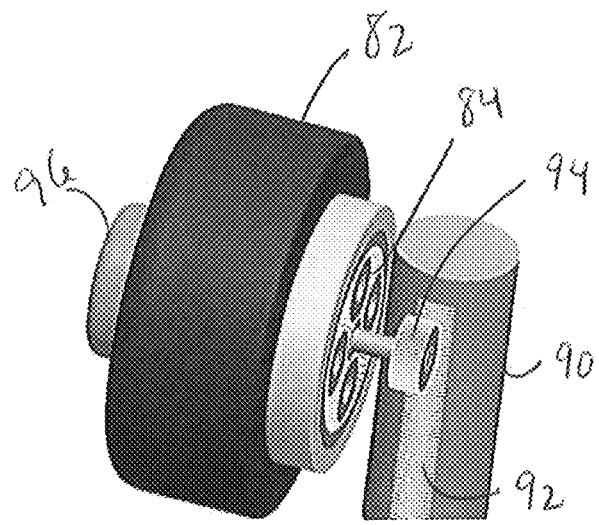
FIG. 8 depicts another partial fragmentary view of the rack and pinion movement system of the assembly of FIG. 6 showing the dial, pinion gear, and linear gear.

FIGS. 6-8 depict another alternative embodiment of a plunger router assembly 80 in which one-handed operation is facilitated by a rack and pinion movement system that includes a dial 82 that operates a planetary gear system 84 to enable macro and micro depth adjustments of the carriage 86. As depicted in FIG. 6, the mounting portion 88 of the carriage 86 is translatably supported on a single guide post 90. The guide post 90 includes a plurality of gear teeth 92 that are arranged to form a linear gear that extends along a length of the guide post 90 (FIGS. 7 and 8).

As depicted in FIGS. 7 and 8, a pinion gear 94 is positioned in engagement with the linear gear 92, or rack, defined on the guide post 90. The pinion gear 94 is configured to be rotated along the linear gear by the dial 82. The rotation of the dial thus causes the carriage to translate along the guide post. To enable macro and micro position adjustments, the dial includes a micro wheel 96. The pinion gear 94 is controlled directly by rotation of the micro wheel 96 to enable fine position adjustments. The macro dial 82 is connected to the pinion gear 94 and micro wheel 96 via the planetary gear system 84 which enables rotation of the macro dial 82 to be used for coarse position adjustments.

As depicted in FIG. 6, a plunge lock button 98 is provided on the carriage to lock the carriage 86 in position relative to the guide post 90. The plunge lock button 98 may be configured to lock the carriage to the guide post in any suitable manner. For example, the plunge lock button may be configured to press a locking member into engagement with the guide post to prevent movement of the carriage along the guide post. Alternatively, the plunge lock button may be configured to engage a portion of the dial or planetary gear system to prevent rotation of the pinion gear with respect to the linear gear on guide post.

Figure 9:
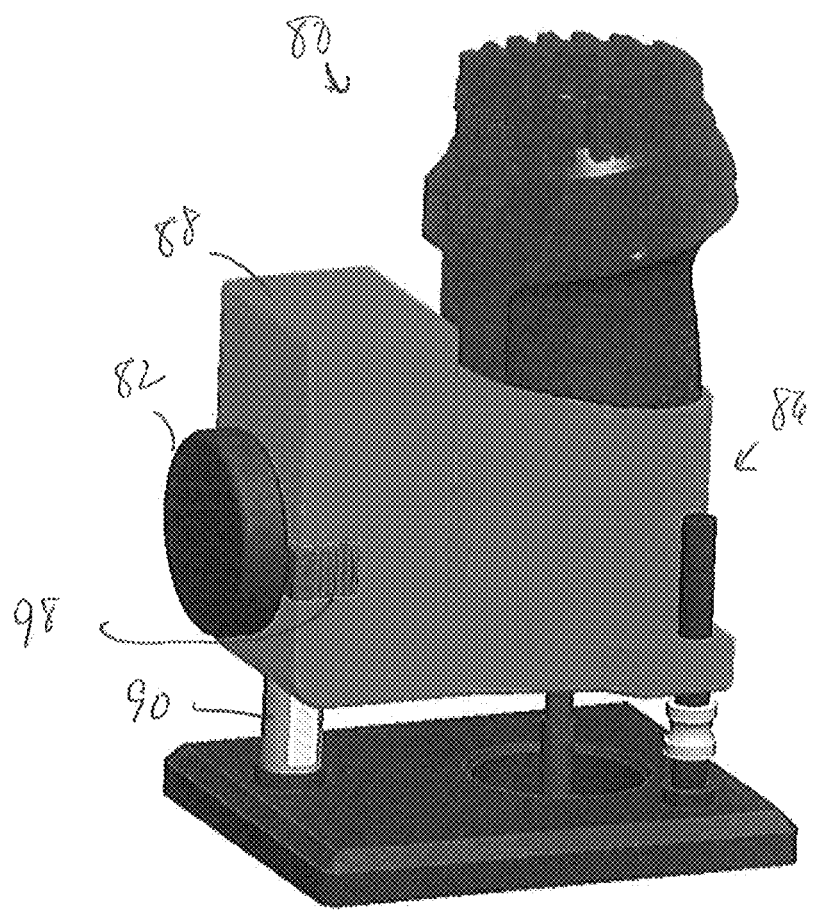
FIG. 9 depicts an alternative embodiment of the plunge router assembly of FIG. 6 having a rack and pinion plunge system with a disengageable dial.
Figure 10:
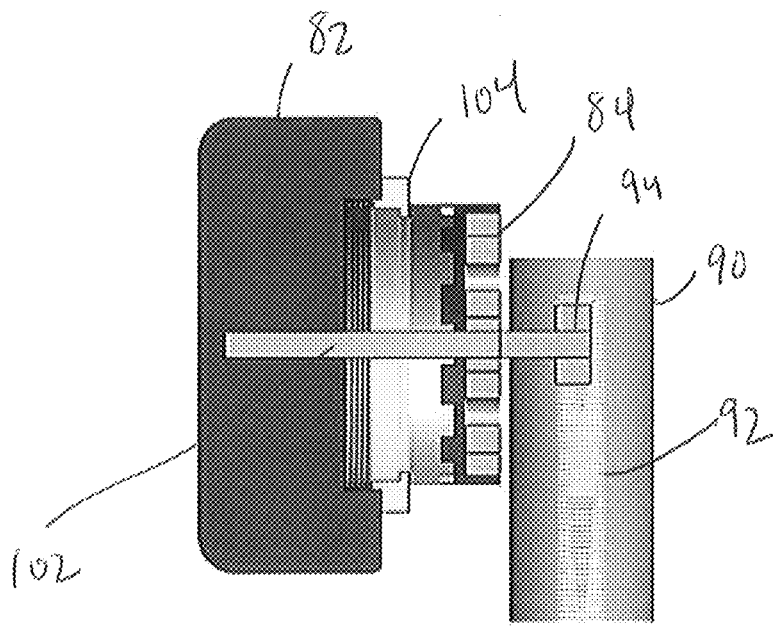
FIG. 10 depicts a partial fragmentary view of the rack and pinion movement system of the assembly of FIG. 9 showing the dial, pinion gear, and linear gear.
Figure 11:
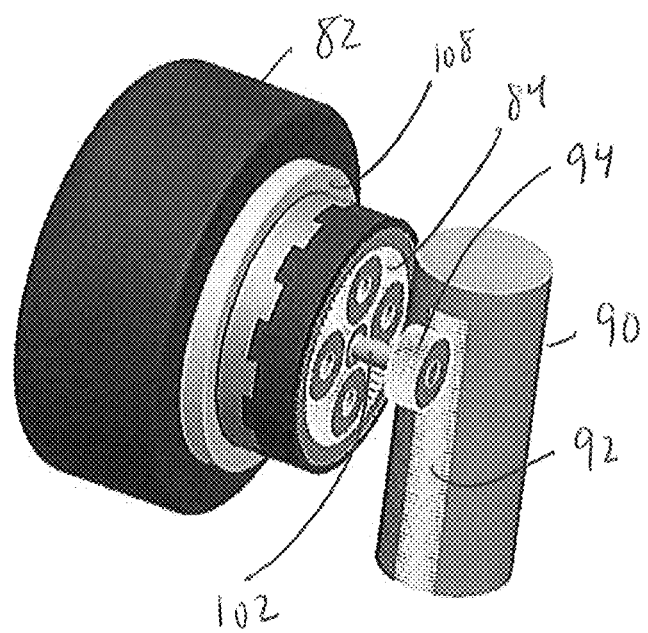
FIG. 11 depicts another partial fragmentary view of the rack and pinion movement system of the assembly of FIG. 9 showing the dial, pinion gear, and linear gear.

FIGS. 9-11 depict an alternative embodiment of the rack and pinion movement system of the plunge router assembly of FIGS. 6-8 in which a single wheel is used to make macro and micro depth adjustments. As can be seen in FIGS. 10 and 11, in this embodiment, the pinion gear 94 is coupled to a shaft 102 that is operated directly by the dial 82 for making fine-grained position adjustments. The planetary gear system 84 is coupled to the shaft 102 for making coarse-grained position adjustments. A push button coupling mechanism 104 is configured to allow the dial 82 to be coupled with the planetary gear system 84 in order to make coarse-grained adjustments and disengaged from the planetary gear system for fine-grained adjustments.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A plunge base for a router, the plunge base comprising:
   a base plate including a generally flat bottom surface and defining an opening through which a router bit of a router supported by the plunge base extends to engage a workpiece;
   a carriage support extending vertically upward from the base plate on one side of the opening;
   a router carriage slidably retained on the carriage support, the router carriage being slidable toward and away from the base plate between a first position and a second position, the router carriage including a collar portion defining an open-ended passage through which a body of a router is extended when the router is supported by the router carriage, the collar portion being configured to retain the router in the open-ended passage with the router aligned with the opening in the base plate;

a plunge lock mechanism configured to retain the router carriage at any position between and including the first position and the second position in relation to the carriage support; and a depth stop mechanism defining a depth limit and configured to prevent movement of the router carriage toward the base plate past the depth limit, wherein the carriage support includes at least one guide post that extends upwardly from the base plate on one side of the opening, wherein the router carriage includes a slide portion that is slidably retained on the guide posts and a router retaining portion that extends from the slide portion over the opening in the base plate, the router retaining portion being configured to releasably secure the router thereto, and wherein the at least one guide post includes a biasing spring located between the slide portion of the router carriage and the base plate for biasing the router carriage toward the first position, and wherein the plunge lock mechanism includes an electromagnet and a switch, the electromagnet incorporated into the slide portion adjacent the at least one guide post, the switch being located on the exterior of the slide portion and configured to control power to the electromagnet, the electromagnet being configured to magnetically attach to the at least one guide post in response to being power on by the switch.

2. The plunge base of claim 1, wherein the carriage support includes two guide posts that each extend upwardly from the base plate on one side of the opening.

3. The plunge base of claim 1, wherein the slide portion of the router carriage includes a gripping portion that protrudes from the slide portion on a side opposite from the router retaining portion.

4. The plunge base of claim 1, wherein the plunge lock mechanism includes a fastening mechanism and a lever, the fastening mechanism being incorporated into the slide portion and configured to be moved into and out of engagement with the at least one guidepost by the lever, the lever being located exterior to the slide portion adjacent to the gripping portion for access by an operator of the plunge base.

5. The plunge base of claim 1, further comprising:
a carriage positioning system configured to controllably move the router carriage between the first position and the second position in relation to the at least one guide post; and
an actuator configured to operate the carriage positioning system.

6. The plunge base of claim 5, wherein the carriage positioning system comprises a rack and pinion system including a linear gear located on the at least one guide post and a pinion gear rotatably supported by the router carriage in position to engage the linear gear,
wherein the actuator comprises a dial attached to the pinion gear which allows the pinion gear to be manually rotated by an operator, and
wherein rotation of the pinion gear in relation to the linear gear causes the router carriage to move up or down the at least one guide post depending on a direction of rotation of the dial.

7. The plunge base of claim 6, wherein the pinion gear is attached to a shaft and the dial is coupled to the shaft by a planetary gear system, the planetary gear system being configured to rotate the shaft in response to rotation of the dial.

8. The plunge base of claim 7, wherein the dial includes a micro wheel that is rotatable with respect to the dial and secured to the shaft for rotating the shaft and the pinion gear directly without rotating the dial, the micro wheel being used to make finer-grained position adjustments than the dial.

9. The plunge base of claim 7, wherein the dial includes a push button mechanism which couples the dial to the shaft in a first position for rotating the pinion gear directly via the shaft and which couples the dial to the planetary gear system in a second position such that the shaft is rotated by the planetary gear system when the dial is rotated.

10. A plunge base for a router, the plunge base comprising:
a base plate including a generally flat bottom surface and defining an opening through which a router bit of a router supported by the plunge base extends to engage a workpiece;
a carriage support extending vertically upward from the base plate on one side of the opening;
a router carriage slidably retained on the carriage support, the router carriage being slidable toward and away from the base plate between a first position and a second position and being configured to releasably secure a router thereto for sliding movement therewith with the router aligned with the opening in the base;
a plunge lock mechanism configured to retain the router carriage at any position between and including the first position and the second position in relation to the carriage support; and
a depth stop mechanism defining a depth limit and configured to prevent movement of the router carriage toward the base plate past the depth limit,
wherein the carriage support includes at least one guide post that extends upwardly from the base plate on one side of the opening,
wherein the router carriage includes a slide portion that is slidably retained on the guide posts and a router retaining portion that extends from the slide portion over the opening in the base plate, the router retaining portion being configured to releasably secure the router thereto,
wherein the at least one guide post includes a biasing spring located between the slide portion of the router carriage and the base plate for biasing the router carriage toward the first position, and
wherein the plunge lock mechanism includes an electromagnet and a switch, the electromagnet incorporated into the slide portion adjacent the at least one guide post, the switch being located on the exterior of the slide portion and configured to control power to the electromagnet, the electromagnet being configured to magnetically attach to the at least one guide post in response to being power on by the switch.

11. A plunge base for a router, the plunge base comprising:
a base plate including a generally flat bottom surface and defining an opening through which a router bit of a router supported by the plunge base extends to engage a workpiece;
a carriage support extending vertically upward from the base plate on one side of the opening;
a router carriage slidably retained on the carriage support, the router carriage being slidable toward and away from the base plate between a first position and a second position and being configured to releasably secure a router thereto for sliding movement therewith with the router aligned with the opening in the base;
a plunge lock mechanism configured to retain the router carriage at any position between and including the first position and the second position in relation to the carriage support; and a depth stop mechanism defining a depth limit and configured to prevent movement of the router carriage toward the base plate past the depth limit;

a carriage positioning system configured to controllably move the router carriage between the first position and the second position in relation to the at least one guide post; and an actuator configured to operate the carriage positioning system, wherein the carriage support includes at least one guide post that extends upwardly from the base plate on one side of the opening, wherein the carriage positioning system comprises a rack and pinion system including a linear gear located on the at least one guide post and a pinion gear rotatably supported by the router carriage in position to engage the linear gear, wherein the actuator comprises a dial attached to the pinion gear which allows the pinion gear to be manually rotated by an operator, and wherein rotation of the pinion gear in relation to the linear gear causes the router carriage to move up or down the at least one guide post depending on a direction of rotation of the dial, wherein the pinion gear is attached to a shaft and the dial is coupled to the shaft by a planetary gear system, the planetary gear system being configured to rotate the shaft in response to rotation of the dial, wherein the dial includes a push button mechanism which couples the dial to the shaft in a first position for rotating the pinion gear directly via the shaft and which couples the dial to the planetary gear system in a second position such that the shaft is rotated by the planetary gear system when the dial is rotated.

12. A plunge base for a router, the plunge base comprising:

a base plate including a generally flat bottom surface and defining an opening through which a router bit of a router supported by the plunge base extends to engage a workpiece;

a carriage support extending vertically upward from the base plate on one side of the opening;

a router carriage slidably retained on the carriage support, the router carriage being slidable toward and away from the base plate between a first position and a second position, the router carriage including a collar portion defining an open-ended passage through which a body of a router is extended when the router is supported by the router carriage, the collar portion being configured to retain the router in the open-ended passage with the router aligned with the opening in the base plate;

a plunge lock mechanism configured to retain the router carriage at any position between and including the first position and the second position in relation to the carriage support;

a depth stop mechanism defining a depth limit and configured to prevent movement of the router carriage toward the base plate past the depth limit;

a carriage positioning system configured to controllably move the router carriage between the first position and the second position in relation to the at least one guide post; and an actuator configured to operate the carriage positioning system, wherein the carriage support includes at least one guide post that extends upwardly from the base plate on one side of the opening, wherein the carriage positioning system comprises a rack and pinion system including a linear gear located on the at least one guide post and a pinion gear rotatably supported by the router carriage in position to engage the linear gear, wherein the actuator comprises a dial attached to the pinion gear which allows the pinion gear to be manually rotated by an operator, wherein rotation of the pinion gear in relation to the linear gear causes the router carriage to move up or down the at least one guide post depending on a direction of rotation of the dial, wherein the pinion gear is attached to a shaft and the dial is coupled to the shaft by a planetary gear system, the planetary gear system being configured to rotate the shaft in response to rotation of the dial, and wherein the dial includes a push button mechanism which couples the dial to the shaft in a first position for rotating the pinion gear directly via the shaft and which couples the dial to the planetary gear system in a second position such that the shaft is rotated by the planetary gear system when the dial is rotated.

* * * * *